(12) United States Patent  (10) Patent No.: US 7,433,177 B2
Tsao et al.  (45) Date of Patent: Oct. 7, 2008

| | | | | | |
|---|---|---|---|---|---|
| (54) | KEYBOARD WITH RECHARGE FUNCTION | | 5,925,110 A * | 7/1999 | Klein ........................... 710/15 |
| | | | 6,972,945 B1 * | 12/2005 | Kozak et al. ................. 361/680 |
| (75) | Inventors: Yung-Sheng Tsao, Taipei (TW); | | 2003/0095288 A1 * | 5/2003 | Hung et al. .................. 358/296 |
| | Chun-Hu Liu, Tao Yuan Shien (TW) | | 2003/0184515 A1 * | 10/2003 | Tsai .............................. 345/156 |
| (73) | Assignee: Quanta Computer Inc., Tao Yuan Shien | | 2004/0095325 A1 * | 5/2004 | Liang ........................... 345/168 |
| | (TW) | | 2005/0036814 A1 * | 2/2005 | Sim ............................. 400/472 |
| | | | 2005/0231485 A1 * | 10/2005 | Jones et al. .................. 345/168 |
| ( * ) | Notice: Subject to any disclaimer, the term of this | | 2006/0250367 A1 * | 11/2006 | Tabasso et al. .............. 345/168 |
| | patent is extended or adjusted under 35 | | 2006/0256097 A1 * | 11/2006 | Oliver .......................... 345/179 |
| | U.S.C. 154(b) by 422 days. | | 2007/0222758 A1 * | 9/2007 | Mulcahy et al. ............. 345/168 |

(21) Appl. No.: 11/259,261

(22) Filed: Oct. 27, 2005

* cited by examiner

(65) Prior Publication Data

US 2007/0047184 A1  Mar. 1, 2007

*Primary Examiner*—Jayprakash N Gandhi
*Assistant Examiner*—Zachary M Pape
(74) *Attorney, Agent, or Firm*—Rabin & Berdo, PC

(30) Foreign Application Priority Data

Aug. 24, 2005  (TW) ............................... 94214552 U

(57) ABSTRACT

(51) Int. Cl.
*G06F 1/16*  (2006.01)
(52) U.S. Cl. ...................... 361/680; 345/168; 345/179;
400/472; 400/477; 400/479; 400/480
(58) Field of Classification Search ................. 361/680;
345/168, 179; 400/472, 477, 479, 480
See application file for complete search history.

A keyboard with a recharge function for a computer system having a rechargeable wireless peripheral is described. The keyboard includes a charger and a charging dock. The charger is disposed inside the keyboard and charges the rechargeable wireless peripheral with power from the keyboard. The charging dock is a channel with an opening on a sidewall of the keyboard and can store the rechargeable wireless peripheral therein so as to electrically couple the rechargeable wireless peripheral to the charger.

(56) References Cited

U.S. PATENT DOCUMENTS 5,841,424 A * 11/1998 Kikinis ....................... 345/168

4 Claims, 2 Drawing Sheets

KEYBOARD WITH RECHARGE FUNCTION

RELATED APPLICATIONS

The present application is based on, and claims priority from, Taiwan Application Serial Number 94214552, filed Aug. 24, 2005, the disclosure of which is hereby incorporated by reference herein in its entirety.

BACKGROUND OF THE INVENTION

1. Field of Invention

The invention relates to a keyboard and, in particular, to a keyboard with a recharge function to charge wireless peripherals.

2. Related Art

Due to their powerful and high-speed computation abilities, computers have been very popular in daily life. As a result of progress in technologies and market competition, the functions and performance of computers have also progressed significantly. Not only can they be used to run programs and network communications, they are further used to play audio/video (AV) media. To remove spatial limitations when operating the computers and the complicated connections between peripherals and the computer host, there are all kinds of wireless peripherals, such as wireless mice, remote controls of AV players, and wireless IP phones. Many wireless peripherals use rechargeable batteries as their primary power source. Such rechargeable batteries require specific chargers, which reduce workable space on the table of the computer when placed together. Chargers disposed somewhere else are inconvenient for the user to reach.

SUMMARY OF THE INVENTION

Therefore, an objective of the invention is to provide a keyboard with a recharge function for a wireless peripheral of a computer system to be charged without using an independent charger.

Another objective of the invention is to provide a keyboard with a recharge function that incorporates a charging dock, such that any wireless peripheral can be conveniently connected to the charging dock on the keyboard.

To achieve the above-mentioned objectives, the disclosed keyboard with a recharge function is used in a computer system, which includes a rechargeable wireless peripheral. The disclosed keyboard includes at least a charger and a charging dock. The charger is disposed inside the keyboard to provide the required power using the connection between the keyboard and the computer system. The charging dock is a channel with an opening on a sidewall of the keyboard and can store the rechargeable wireless peripheral therein so as to electrically couple the rechargeable wireless peripheral to the charger.

The charging method between the charging dock and the peripheral includes the direct transmission of a current to the wireless peripheral via electrical contacts. Alternatively, the charging dock can produce a varying magnetic field, which induces charging power in the wireless peripheral to charge the batteries.

Moreover, the disclosed keyboard with a recharge function is used in a computer having a rechargeable wireless peripheral. The keyboard with a recharge function is a wireless keyboard that transmits signals in a wireless method to the computer system. The wireless keyboard includes at least a rechargeable power source, an external power supply, and a charging dock. The rechargeable power source is disposed therein to provide the power needed by the wireless keyboard. The external power supply is connected to the wireless keyboard. The charging dock is a channel with an opening on a sidewall of the wireless keyboard and can accommodate the wireless peripheral. The charging dock is connected to the rechargeable power source. When the external power supply provides power to the wireless keyboard, the rechargeable power source is charged and the wireless peripheral is charged via the charging dock. When the external power supply does not provide power to the wireless keyboard, the wireless peripheral is charged by the power of the rechargeable power source. The external power supply also provides the power needed for the operation of the wireless keyboard.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
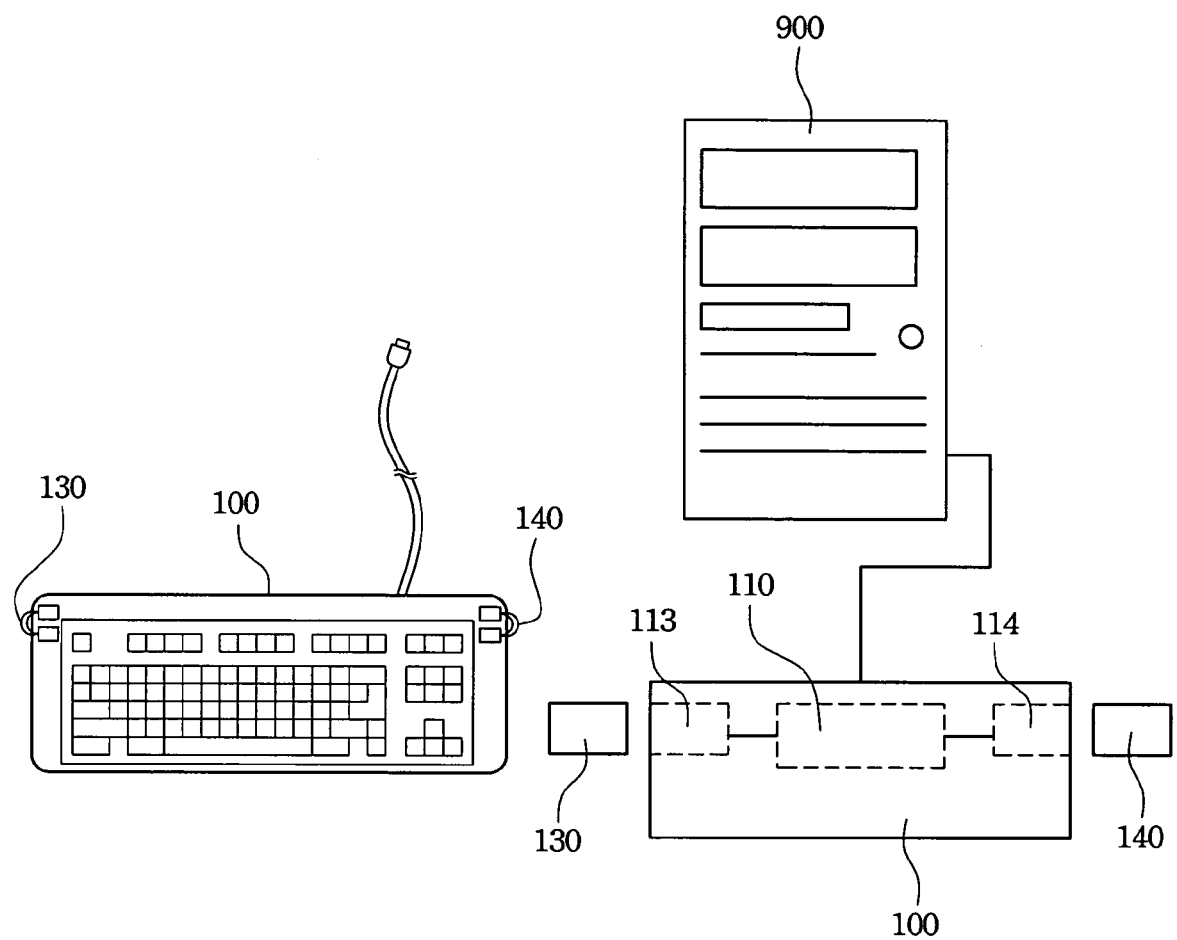
FIG. 1 is a schematic view of the keyboard with a recharge function according to a first embodiment of the invention.

As shown in FIG. 1, the disclosed keyboard 100 with a recharge function is connected to a computer host 900. The computer system includes rechargeable wireless peripherals 130, 140, which can be media remote controls, wireless mice, wireless microphones, wireless IP phones, etc. The keyboard 100 includes a charger 110 and charging docks 113, 114. The charger 110 is disposed inside the keyboard 100. The power for the charger 110 is provided via the connection between the keyboard 100 and the computer host 900. The charging docks 113, 114 are channels with openings on sidewalls of the keyboard 100. The internal spaces of the channels can accommodate respectively the wireless peripherals 130, 140 that are connected to the charger 110. The wireless peripherals 130, 140 are charged by the power of the charger 110.

The charging method between the charging docks 113, 114 and the wireless peripherals 130, 140 can be direct transmission of a current via electrical contacts. An alternative method is achieved by electromagnetic inductance, wherein the charging docks 113, 114 produce varying magnetic fields that induce charging energy in the wireless peripherals 130, 140 to charge their batteries.

Figure 2:
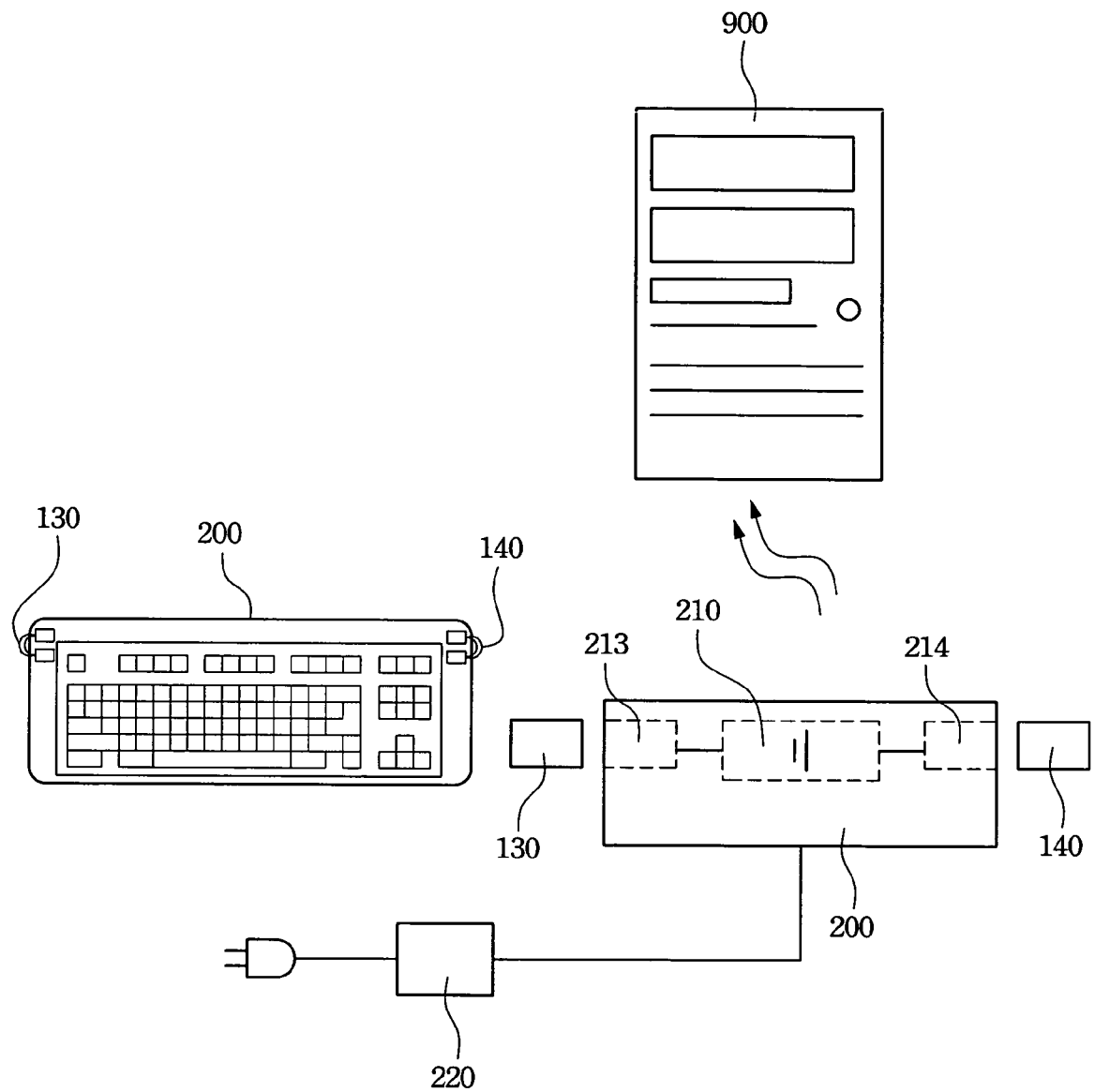
FIG. 2 is a schematic view of the keyboard with a recharge function according to a second embodiment of the invention.

As shown in FIG. 2, the disclosed keyboard with a recharge function also includes a wireless keyboard 200, which transmits signals in a wireless method to the computer host 900. The computer system further includes rechargeable wireless peripherals 130, 140. The wireless keyboard 200 contains a rechargeable power source 210, an external power supply 220, and charging docks 213, 214. The rechargeable power source 210 is disposed inside the wireless keyboard 200, providing the power needed by the wireless keyboard 200. The external power supply 220 is connected to the wireless keyboard 200. The charging docks 213, 214 are channels with openings on sidewalls of the wireless keyboard 200. The internal spaces of the channels can accommodate respectively the wireless peripherals 130, 140. The charging docks 213, 214 are both connected to the rechargeable power source 210. When the external power supply 220 provides power to the wireless keyboard 200, the rechargeable power source 210 is charged and the wireless peripherals 130, 140 are charged via the charging docks 213, 214. When the external power supply 220 does not provide power to the wireless keyboard 200, the wireless peripherals 130, 140 are charged by the power of the rechargeable power source 210. The external power supply 220 also provides the power needed for the operation of the wireless keyboard 200.

The charging method between the charging docks 213, 214 and the wireless peripherals 130, 140 is the same as the previous embodiment. It may be direct transmission of current to the wireless peripherals 130, 140 via electrical contacts. Alternatively, it may be achieved by electromagnetic inductance, wherein the charging docks 213, 214 produce varying magnetic fields that induce charging energy in the wireless peripherals 130, 140 to charge their batteries.

The invention can have various other embodiments. For example, the size of the space in the channel of the charging dock, the number of charging docks, and the charging energy can be freely set according to the wireless peripherals. Such variations are not to be regarded as a departure from the spirit and scope of the invention, and all such modifications as would be obvious to one skilled in the art are intended to be included within the scope of the following claims.

What is claimed is:

1. A wireless keyboard with a recharge function for a computer system, having a rechargeable wireless peripheral and transmitting signals in a wireless method to the computer system, the wireless keyboard comprising:

a rechargeable power source disposed inside the wireless keyboard for providing power needed by the wireless keyboard;

an external power supply connected to the wireless keyboard; and a charging dock as a channel with an opening on a sidewall of the wireless keyboard and an internal space for accommodating the wireless peripheral, the charging dock being connected to the rechargeable power source;

wherein the rechargeable power source is charged by the external power supply and the wireless peripheral is charged by the charging dock when the external power supply provides power to the wireless keyboard, and the wireless peripheral is charged by the charging dock using the power of the rechargeable power source when the external power supply does not provide power to the wireless keyboard.

2. The keyboard with a recharge function of claim 1, wherein the charger transmits an electrical current to the wireless peripheral directly via electrical contacts.

3. The keyboard with a recharge function of claim 1, wherein the charging dock generates a varying magnetic field that induces a charging energy in the wireless peripheral for charging.

4. The keyboard with a recharge function of claim 1, wherein the external power supply also provides power needed by the wireless keyboard.

* * * * *